W. A. DICK.
DYNAMO ELECTRIC MACHINE.
APPLICATION FILED DEC. 31, 1908.

1,010,126.

Patented Nov. 28, 1911.

2 SHEETS—SHEET 1.

WITNESSES:
Fred H Miller
R J Dearborn

INVENTOR
William A. Dick
BY
Wiley G. Carr
ATTORNEY

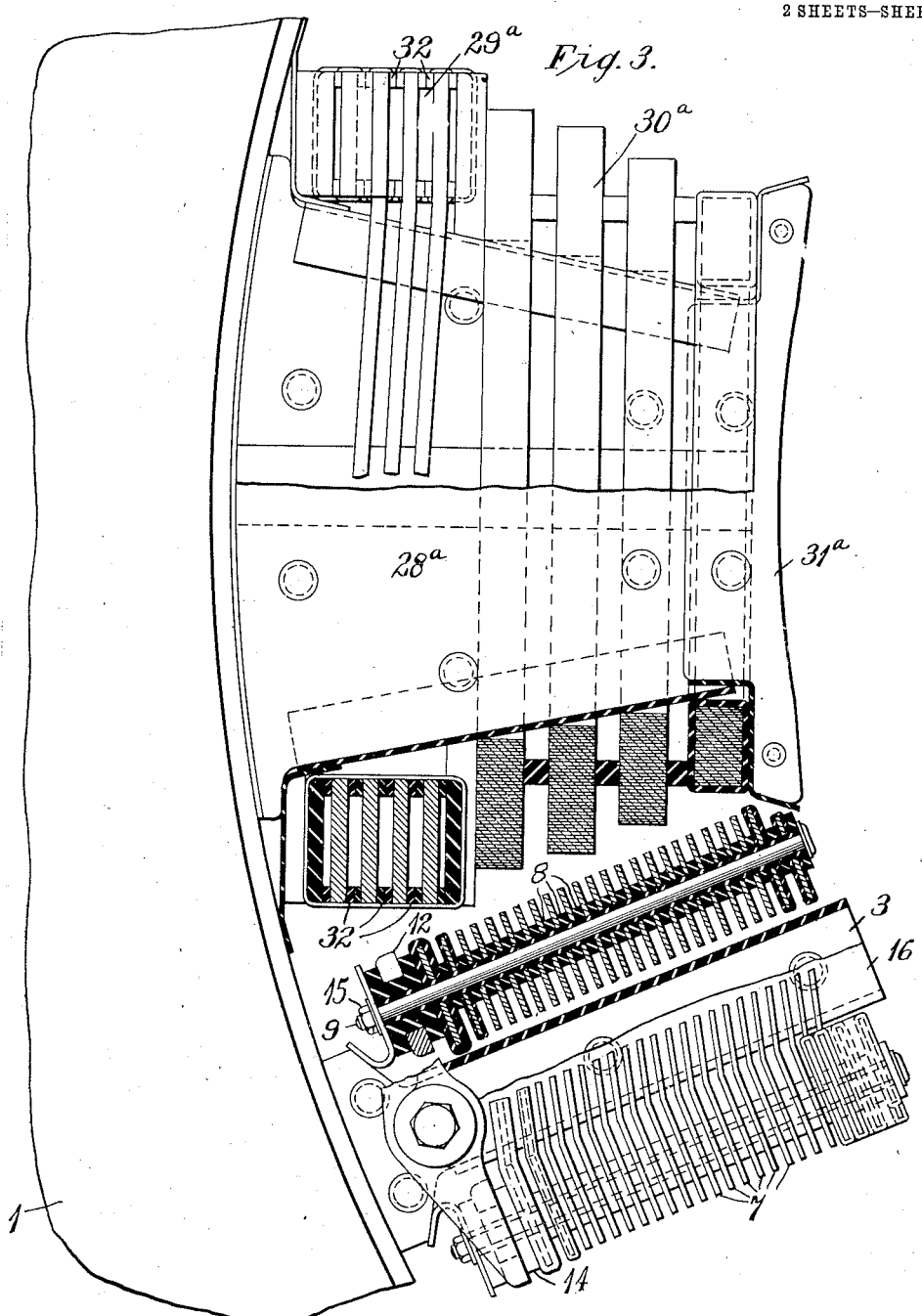

UNITED STATES PATENT OFFICE.

WILLIAM A. DICK, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

1,010,126.  Specification of Letters Patent.  Patented Nov. 28, 1911.

Application filed December 31, 1908. Serial No. 470,205.

*To all whom it may concern:*

Be it known that I, WILLIAM A. DICK, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and it has for its object to provide a field coil structure of such character that a machine of a given rating may be more economically constructed and operated than has heretofore been possible.

The normal capacity or rating of a dynamo-electric machine is partially determined by the maximum temperature rise of its stationary parts, in operation. In direct current machines having rotating armatures and stationary field magnets, the field magnet windings are most likely to become overheated in operation, and this is particularly true of machines which are provided with intermediate poles for the purpose of improving the commutation, since the coils on the intermediate pole pieces are close to the coils on the main pole pieces.

According to my present invention, I provide simple and efficient coil structures which are capable of general application but are primarily intended for machines which are cooled by forced ventilation.

Figure 1:
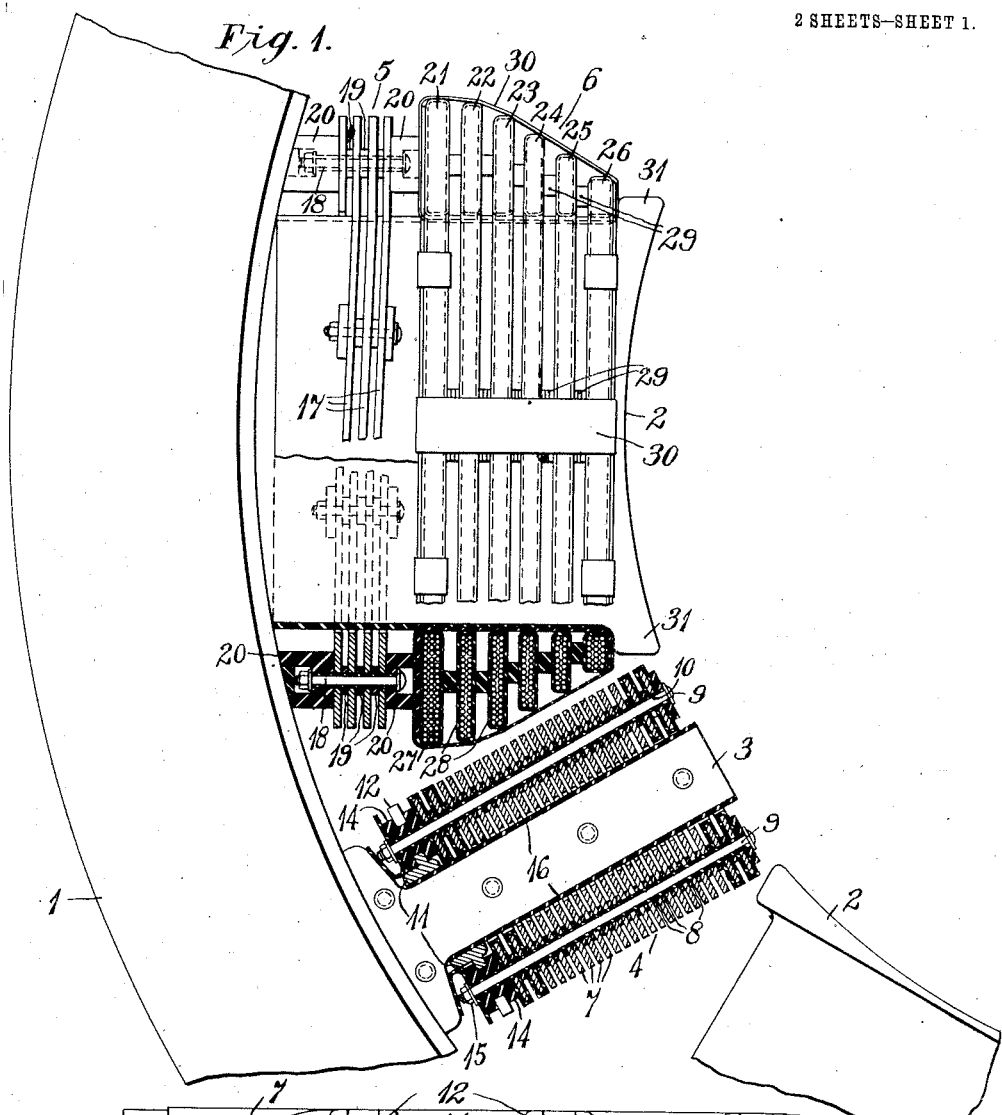
Figure 2:
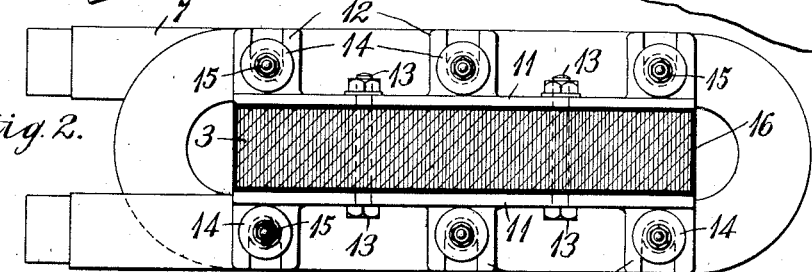

Figure 1 of the accompanying drawing is an end elevation, partially in section, of a portion of the stationary field magnet frame and windings of a dynamo-electric machine embodying my invention. Fig. 2 is a bottom plan view of one of the coils shown in Fig. 1, the auxiliary pole piece being shown in section, and Fig. 3 is a view similar to Fig. 1 but illustrating a modification of my invention.

Referring to Figs. 1 and 2 of the drawing, the structure here illustrated comprises a stationary frame 1 having a plurality of main polar projections 2 and intermediate polar projections 3, auxiliary coils 4 on the intermediate polar projections 3, and series coils 5 and shunt coils 6 on the main polar projections 2. Each of the auxiliary coils 4 comprises a plurality of turns or convolutions 7 of strap conductor, which are spaced apart by any suitable means to permit the free circulation of air between them, such as insulating washers 8, the turns being held firmly in position by means of bolts 9 having sleeves 10 of insulating material. Coil-supporting rods or bars 11, having a plurality of slotted projections 12, are secured to the intermediate polar projections 3, near the body of the frame 1, by means of bolts 13. The outer ends of the bolts 9 are provided with spools or bushings 14 of insulating material which are located in the slots in the projections 12. In assembling the auxiliary coils 4, the insulating spools or bushings 14 are first placed in the slots in the projections 12. The coils 4, with the bolts 9 in position, are then placed upon the auxiliary projections 3, with the ends of the bolts projecting through the spools 14. The coil is finally clamped rigidly in position by means of nuts 15. The polar projection itself is provided with a wrapping 16 of insulating material and the convolutions of the coil which are near the ends of the projections are wound with tape, or otherwise insulated, the intermediate convolutions being left uncovered to facilitate the radiation of heat from their surfaces. The series coil 5 is similar in construction to the auxiliary coil 4 and comprises several convolutions 17, of bare copper strap or other suitable conductor, which are bound together by clamping bolts 18, being first spaced apart by insulating washers 19. The ends of the bolts 18 are counter-sunk into insulating blocks 20 which serve to space the coil from the shunt coil 6 on one side and from the body of the frame 1 on the other. The shunt coil 6 comprises a plurality of layers or bundles 21, 22, 23, 24, 25 and 26, which vary in cross-sectional form according to their positions on the main polar projection 2 and each of which is composed of a large number of convolutions 27 of conducting wire or strap. Since the side faces of each polar projection are parallel to each other, and since the projections extend radially inward from the cylindrical frame structure 1, the adjacent sides of adjacent projections obviously converge toward the center so that their inner ends are relatively close together. The bundles or layers of which the shunt coil winding is composed are accordingly varied in width to avoid interference with the auxiliary winding 4. Each of the layers of the coil 6 is virtually a separate winding, and is provided with an independent insulating wrapping 28. The several layers are spaced apart by strips or blocks 29 and their relative positions are maintained by bands 30, which are relatively narrow and only cover a small percentage of the surface of the coil. The coils 5 and 6, which are located on the main polar projections, are held in place by pole tips 31, the polar projections themselves being detachably secured to the frame 1.

The above described field magnet coils are relatively simple to manufacture and are held rigidly in position without interfering with ventilation, a maximum radiating surface being exposed to the atmosphere.

Reference may now be had to Fig. 3 in which corresponding parts are designated by the same reference characters. In lieu of the main pole pieces 2 of Fig. 1, which are provided with parallel side faces, main pole pieces 28ª are substituted, the sides of which, adjacent to the intermediate pole pieces 3, are substantially radial. By this means, the magnetic leakage in the core member is reduced, and the space for the series and shunt coils 29ª and 30ª, is materially increased. Each of the pole pieces 28ª is provided with a tip 31ª the face dimensions of which are substantially the same as those of the tip 31 shown in Fig. 1. The coil 30ª is composed of a plurality of layers which are of different internal dimensions in order that the coil may fit the pole piece. The coil 29ª comprises a plurality of convolutions which are spaced apart at intervals by blocks 32 of insulating material, the convolutions being wrapped with tape or other suitable means being provided for maintaining the proper relation between them. The intermediate pole and its coil are similar to those shown in Fig. 1 and the series coil 29ª may be replaced by a structure similar to the coil 5 of Fig. 1, provided there is sufficient space between the shunt coil and the frame of the machine to permit of the use of spacing blocks 20.

It will, of course, be understood that structural modifications may be effected without departing from the spirit of my invention, and I desire that only such modifications shall be imposed as are indicated in the appended claims.

I claim as my invention;

1. A field magnet coil for dynamo-electric machines comprising bundles or layers of different widths each composed of a plurality of convolutions of a conductor bound together by a wrapping of insulating material, spacing blocks between the layers and relatively narrow bands for securing the layers together.

2. A field magnet winding for dynamo-electric machines comprising a series coil having a plurality of turns of strap conductor spaced apart by insulating washers and clamped together by insulated bolts and a shunt coil comprising a plurality of sections separated by spacing blocks for ventilation.

3. A field magnet winding for dynamo-electric machines comprising a series coil having a plurality of turns of strap conductor spaced apart by insulating washers and clamped together by insulating bolts and a shunt coil comprising bundles or layers severally composed of a plurality of convolutions of a conductor and means for spacing the bundles or layers apart.

4. A field magnet winding for dynamo-electric machines comprising a series coil composed of a plurality of turns of strap conductor spaced apart by insulating washers and clamped together by insulated bolts and a shunt coil comprising bundles or layers severally composed of a plurality of convolutions of a conductor, spacing blocks of insulating material between the layers, and insulating bands for fastening the layers together.

5. In a dynamo-electric machine the combination with main and intermediate polar projections, of series coils and shunt coils for the main projections, said shunt coils severally comprising bundles or layers each of which is composed of a plurality of convolutions of a conductor, spacing blocks of insulating material between the layers and insulating bands for fastening the layers together, the side faces of the main projections being substantially radial and the bundles or layers of the shunt coils being offset to conform to the shape of the polar projections.

6. A dynamo-electric machine comprising a field magnet frame having a polar projection, coil-supporting means secured to the base of the projection, a coil mounted on the projection, and means for detachably clamping said coil directly to said supporting means.

7. A dynamo-electric machine comprising a field magnet frame having a polar projection, coil-supporting bars secured to the base of the projection and a coil, having spaced turns, mounted on the projection and secured to the bars.

8. A dynamo-electric machine comprising a field magnet frame having a polar projection and wrapping of insulation therefor, coil-supporting means secured to the base of the projection and a coil mounted on the projection, said coil comprising a plurality of spaced convolutions of strap conductor secured to the supporting means by insulated bolts.

9. A field magnet winding for dynamo-electric machines comprising a series coil and shunt coil and an auxiliary or commutating field coil, said series and commutating field coils comprising a plurality of turns of strap conductor spaced apart by insulating washers and clamped together by insulated bolts.

10. A field magnet winding for dynamo-electric machines comprising a series coil and shunt coil and an auxiliary or commutating field coil, said series and commutating field coils comprising a plurality of turns of strap conductor spaced apart by insulating washers and clamped together by insulated bolts and said shunt coil comprising a plurality of sections separated by spacing blocks for ventilation.

In testimony whereof, I have hereunto subscribed my name this 21st day of December, 1908.

WILLIAM A. DICK.

Witnesses:
M. V. BLAKEMORE,
BIRNEY HINES.